United States Patent [19]
Biensan et al.

[11] 3,878,173
[45] Apr. 15, 1975

[54] PROCESS FOR OBTAINING HIGH MOLECULAR WEIGHT POLYAMIDES FROM LACTAMS

[75] Inventors: M. Michael Biensan; M. Philippe Potin, both of Billiere, France

[73] Assignee: Societe Aquitaine Total Organico, Courbevoie, France

[22] Filed: Aug. 16, 1972

[21] Appl. No.: 281,226

[30] Foreign Application Priority Data
Aug. 25, 1971  France .............................. 71.30753

[52] U.S. Cl. ......... 260/78 L; 260/78 P; 260/45.7 S; 264/176 F
[51] Int. Cl. .......................................... C08g 20/18
[58] Field of Search ............. 260/78 L, 78 P, 45.7 S

[56] References Cited
UNITED STATES PATENTS
3,057,830  10/1962  Corbin ............................. 260/78 L
3,607,971  9/1971  McGrath ........................... 260/78 L OTHER PUBLICATIONS
A.P.C. Application of Hagedorn, Ser. No. 323,512, Published Apr. 20, 1943.

*Primary Examiner*—Lucille M. Phynes

[57] ABSTRACT

This invention concerns a process for obtaining polyamides by the anionic polymerization of lactams in an anhydrous medium, in the presence of alkaline catalysts, usually sodium catalysts, and possibly activators.

In this process, the polymer is mixed with one or more substances which, under the circumstances, are more acid than the amide functions of the polymers and lactames, and which produce only limited or no acid hydrolysis in of the polymer chains.

The invention refers to an improved process for obtaining polyamides with high molecular weight.

10 Claims, No Drawings

PROCESS FOR OBTAINING HIGH MOLECULAR WEIGHT POLYAMIDES FROM LACTAMS

This invention concerns an improved process for obtaining polyamides. More specifically, it concerns an improved process for obtaining polyamides from lactames with at least 4 carbon atomes in the ring, particularly caprolactame and/or dodecalactame.

It also concerns polyamides obtained in this way, and films, bands, fibres and moulded objects made from them.

ε-caprolactame can be used to obtain substances with a high molecular weight, when the lactame is heated in an anhydrous medium in the presence of substances setting an alkaline ion free, such as sodium, sodium hydride, sodium and potassium alcoholate, and particularly in the presence of a sodium salt of the lactame used. Polymerization can take place at temperatures between 220° and 250°C, or at lower temperatures, between 150° and 180°C, if an activator is added.

The 6-polyamides obtained are rather unsatisfactory, since their viscosity is unstable. During the subsequent treatments at usually fairly high temperature, to which such polyamides are subjected in the making of fibres, films, sheets, moulded objects, etc, the molecular weight is found to decrease rapidly, and it is almost impossible to obtain uniform viscosity in the molten state within a reasonable period of time. This objectionable feature arises from the fact that the polymerization is an equilibrium reaction, with the equilibrium adjusting to produce lactame when the temperature rises. At 230°C, for instance, approximately 10 % monomer lactame is found in the molten polymer.

This equilibrium reaction makes it impossible to remove the caprolactame in the anionic 6-nylon by degassing, since the equilibrium is immediately reestablished by depolymerization, as the monomer is extracted.

To prevent the decomposition of the polymer that occurs in existing processes, it has to be washed with acidified aqueous solutions, to eliminate the sodium. This has to be followed by washing with water and drying, which considerably increases the cost of the polyamide.

In the case of dodecalactame, it is also possible to obtain polyamides with high molecular weight, when the lactame is heated in an anhydrous medium, in the presence of substances setting an alkaline ion free, such as sodium hydride or alcoholate, or the sodium salt of the lactame used. Polymerization can take place at temperatures between 230° and 270°C, or at lower temperatures if an activator is added.

No depolymerization occurs in the 12-polyamides obtained by this process, but there is a completely chaotic development of the melting viscosity of the polymer and its viscosity in solution, resulting from a simultaneous process of chain breakage and disorderly branchings.

This invention concerns an improved process for obtaining polyamides with high molecular weight, in which these objectionable features can be overcome. The process is of particular interest because it can be applied to the anionic polymerization, in an anhydrous medium and in the presence of alkaline catalysts, of all lactames, producing polyamides with completely stable viscosity in the molten state. The process can be used in particular to obtain polymers and copolymers from caprolactame, capryllactame and/or dodecalactame, for instance.

This invention concerns a process for obtaining polyamides by the anionic polymerization of lactames in an anhydrous medium, in the presence of alkaline catalysts, usually sodium catalysts, and possibly activators, characterized by the fact that the polymer is mixed with one or more substances which, under the circumstances, are more acid than the amide functions of the polymers and lactames, and which produce only limited or no acidolysis of the polymer chains.

In one embodiment of the invention, these substances are one or more sulphonic acids or substances producing sulphonic acids, such as sulphonic esters.

In another embodiment of the invention, the substances are one or more aryl-sulphonic acids or esters, particularly benzene sulphonic and/or toluene sulphonic acids or esters.

In yet another embodiment of the invention, the substances are one or more alkyl-sulphonic acids or esters, such as methane sulphonic acid.

According to one feature of the invention, these substances are added to the polyamide in ratios of between 0.05 and 2 moles, and preferably 0.2 to 1 mole, per 100 moles of the initial lactame; the proportions depend on the quantity of sodium present at the beginning.

In one embodiment of the invention, the substances are added at the end of polymerization, by being mixed with the molten polymer in the polymerization reactor.

In another embodiment of the invention, the substances are added to the polymer by being made into a paste, followed by mixing or extrusion.

The invention also concerns fibres, films, sheets, moulded objects and other products made from polyamides produced by this process.

Other purposes and advantages of the invention will be shown by the following examples representing some embodiments of the invention, which, however, are in no way confined to these examples.

Unless otherwise stated, the inherent viscosity was measured at 20°C, using 0.5 % solutions in m-cresol, and the molten viscosity, expressed in poises, at 220°C, using an Instron rheometer, at a shearing velocity of $31.1^{sec-1}$.

EXAMPLES 1 to 4

6-nylon was prepared in the standard way by anionic polymerization of ε-caprolactame, in the presence of 0.075 % weight of sodium in the catalyst, (i.e. 0.37 % moles of sodium).

The polymer was then extruded at a temperature of 230°C, in the presence of a 40 % molar excess, in relation to the sodium, of para-toluene sulphonic acids or esters, as shown in table 1 below, (i.e. 0.52 % moles).

Example 1 was a control test, for comparison purposes, in which the polymer was extruded without addition of the substances proposed in this invention.

For the purposes of comparison, two successive extrusions were carried out.

The results of the test show:
 the drop in viscosity of the control polymer during each extrusion operation, and its depolymerization by sublimation;
 the fact that every one of the stabilizing agents used prevented depolymerization;

the fact that the drop in viscosity recorded during the first extrusion process was less for p-toluene sulphonic acid than for the corresponding esters.

Table 1

| Example | Stabilizing agent | No of extrusions | Inherent viscosity | % extractable by sublimation at 230°C with 0.5 mm-Hg pressure |
|---|---|---|---|---|
| 1 | Control | 0 | 1.48 | 50.2 |
|  |  | 1 | 1.37 | 34.9 |
|  |  | 2 | 1.28 | 22.9 |
| 2 | p-toluene sulphonic acid | 1 | 1.41 | 2.46 |
|  |  | 2 | 1.40 | 2.27 |
| 3 | methyl p-toluene sulphonate | 1 | 1.35 | 2.37 |
|  |  | 2 | 1.36 | 2.15 |
| 4 | ethyl p-toluene sulphonate | 1 | 1.39 | 2.44 |
|  |  | 2 | 1.37 | 2.17 |

EXAMPLES 5 to 8

12-polyamide was prepared in the standard way by anionic polymerization of dodecalactame, with 0.63 % moles of sodium.

The polymer was then extruded at a temperature of 230°C, in the presence of a 60 % molar excess, in relation to the sodium, of the acids or esters shown in table 2 below (i.e. 1 % moles).

Table 2

| Ex. | Stabilizing agent | Viscosity | Non-extruded | 1st extrusion | 2nd extrusion |
|---|---|---|---|---|---|
| 5 | Control | inheretn | 1.50 | 1.22 | 1.14 |
|  |  | $\eta$ poises | 34,370 | 27,500 | 21,630 |
| 6 | methyl p-toluene sulphonate | inherent | 1.50 | 1.42 | 1.44 |
|  |  | $\eta$ poises | 34,370 | 41,350 | 41,240 |
| 7 | ethyl p-toluene sulphonate | inherent | 1.50 | 1.39 | 1.37 |
|  |  | $\eta$ poises | 34,370 | 31,620 | 37,120 |
| 8 | P-toluene sulphonic acid | inherent | 1.50 | 1.50 | 1.52 |
|  |  | $\eta$ poises | 34,370 | 32,215 | 35,308 |

Each sample was extruded twice, and the inherent viscosity and molten viscosity at 220°C, for shearing velocity of $31.1^{sec-1}$, were measured. For tests with stabilizing agents, the agents were added to granules of the original sample by being mixed in a container. The two successive series of extrusions were then performed in turn.

The results show that:
both inherent and molten viscosity, which drop sharply in the control sample, are left almost unchanged when the process proposed in the invention is adopted;
variation in the original viscosity is less when paratoluene sulphonic acid is used.

EXAMPLE 9 to 12

The inherent viscosity of samples of 12-polyamide obtained by anionic polymerization with 0.72 % moles of sodium was measured.

The same method was adopted as in examples 5 to 8, in the presence of a 60 % molar excess of acids or esters shown in table 3 below, which also shows the results of measurements after the two extrusion operations.

Table 3

| Example | Stabilizing agent | Non-extruded | 1st extrusion | 2nd extrusion |
|---|---|---|---|---|
| 9 | Control | 1.41 | 1.22 | 1.20 |
| 10 | 1 % moles ethyl methane sulphonate | 1.41 | 1.41 | 1.36 |
| 11 | 1 % moles methane sulphonic acid | 1.41 | 1.33 | 1.30 |
| 12 | 1 % moles benzene sulphonic acid | 1.41 | 1.36 | 1.36 |

EXAMPLES 13 to 16

The same method was adopted as in example 9 to 12, but using a polymer with an inherent viscosity of 1.35 before extrusion, instead of 1.41.

Table 4 shows the results of these tests.

Table 4

| Example | Stabilizing agent | Non-extruded | 1st extrusion | 2nd extrusion |
|---|---|---|---|---|
| 13 | Control | 1.35 | 1.13 | 1.09 |
| 14 | 0.5% moles ethyl p-toluene sulphonate | 1.35 | 1.38 | 1.34 |
| 15 | 0.72% moles p-toluene sulphonic acid | 1.35 | 1.38 | 1.33 |
| 16 | 1% moles p-toluene sulphonic acid | 1.35 | 1.37 | 1.32 |

The results in tables 3 and 4 show that:
the inherent viscosity drops sharply in the control test, and is left almost unchanged when the process used in the invention is adopted.

Naturally, the invention is not confined to the embodiments described here: many alternative forms are possible, for someone skilled in the art, and depending on the applications involved, without any departure from the spirit of the invention.

What is claimed is:

1. A process for producing high molecular weight polyamides which comprises anionically polymerizing at least one lactam having at least 4 carbon atoms in the ring in the presence of an alkali catalyst and mixing the resulting polymer with at least one member selected from the group consisting of an arylsulfonic acid, an alkylsulfonic acid, and esters thereof.

2. A process as defined in claim 1, in which the lactam is a member selected from the group consisting of caprolactam, dodecalactam and capryllactam.

3. A process as defined in claim 1, in which said arylsulfonic acid is toluene sulphonic acid or an ester thereof.

4. A process as defined in claim 3, in which the toluene sulphonic acid is para toluene sulphonic acid or an ester thereof.

5. A process as defined in claim 1, in which the said arylsulfonic acid is benzene sulphonic acid or an ester thereof.

6. A process as defined in claim 1, in which said alkylsulfonic acid is methane sulphonic acid or an ester thereof.

7. A process as defined in claim 1, in which said acid or ester is added to the polymer in the ratio of between 0.05 and 2 moles to 100 moles of the starting lactame.

8. A process as defined in claim 1, in which between 0.2 and 1 mole of the said acid or ester, per 100 moles of lactame, is added.

9. A process as defined in claim 1, in which said acid or ester is added after polymerization, by being mixed with the molten polymer in the polymerization reactor.

10. A process as defined in claim 1, in which said acid or ester is added to the polymer by being made into a paste, followed by mixing or extrusion.

* * * * *